(12) United States Patent
Miyamoto

(10) Patent No.: US 7,484,615 B2
(45) Date of Patent: Feb. 3, 2009

(54) STOPPER CYLINDER

(75) Inventor: Mitsuo Miyamoto, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 10 days.

(21) Appl. No.: 11/763,985

(22) Filed: Jun. 15, 2007

(65) Prior Publication Data

US 2007/0295578 A1 Dec. 27, 2007

(30) Foreign Application Priority Data

Jun. 21, 2006 (JP) .............................. 2006-171219

(51) Int. Cl.
*B65G 13/00* (2006.01)
(52) U.S. Cl. ................ 198/345.1; 193/35 A; 198/459.6
(58) Field of Classification Search ... 198/345.1–345.3, 198/459.6–459.7, 782; 193/35 A
See application file for complete search history.

(56) References Cited

U.S. PATENT DOCUMENTS

| 3,970,180 | A | * | 7/1976 | Schlottmann et al. ..... 193/35 A |
| 4,000,796 | A | * | 1/1977 | Bolton et al. ............. 193/35 A |
| 5,211,276 | A | * | 5/1993 | Clopton .................... 198/345.3 |
| 6,119,843 | A | * | 9/2000 | Robinson .................. 193/35 A |
| 6,164,430 | A |   | 12/2000 | Nishimura |
| 6,220,418 | B1 | * | 4/2001 | Moradians ................. 193/35 A |
| 6,230,908 | B1 | * | 5/2001 | Sloan et al. .................. 211/151 |
| 6,575,285 | B2 | * | 6/2003 | Jong ....................... 192/131 R |

FOREIGN PATENT DOCUMENTS

| JP | 02-100918 | 4/1990 |
| JP | 3415425 | 4/2003 |
| KR | 1995-0004819 | 5/1995 |

* cited by examiner

*Primary Examiner*—Mark A Deuble
(74) *Attorney, Agent, or Firm*—Paul A. Guss

(57) ABSTRACT

A lever, provided with rollers, is rotatably supported with respect to a lever holder. A lock pin disposed on the lever engages with a lock pawl of a lock mechanism. Accordingly, rotary action of the lever is regulated so as to stop a workpiece that is transported in a predetermined direction. On the other hand, when the workpiece is transported in a direction opposite to the predetermined direction, a second bracket having the lock pawl is rotated due to a pressing action of the lock pin. Accordingly, the lever is released from its rotation-regulated state effected by the lock pin, whereupon the lever is rotated and displaced.

9 Claims, 17 Drawing Sheets

STOPPER CYLINDER

BACKGROUND OF THE INVENTION

1. Field of the Invention

The present invention relates to a stopper cylinder, which is capable of stopping a transported workpiece, and positioning the workpiece at a predetermined position, by means of a lock mechanism.

2. Description of the Related Art

A stopper cylinder has formerly been used, for example, so that a workpiece, which is transported by a conveyor line including, for example, a plurality of aligned roller conveyors, is stopped at a predetermined position. The stopper cylinder comprises a piston rod that is movable back and forth under an urging action, and a lever member, which engages the forward end of the piston rod. The lever member protrudes upwardly a predetermined length with respect to a transport surface of the conveyor line, from a gap formed between adjoining roller conveyors, such that the transport objective abuts against a guide roller that is provided on the lever member. Accordingly, the stopper cylinder functions as a stopper for stopping the transport objective.

In the stopper cylinder described above, in a locked state in which the lever member protrudes upwardly to stop the transport objective, the locked state is not released when the transport objective is transported in a direction opposite to the predetermined transport direction. Therefore, the operator cannot move the transport objective manually in a direction opposite to the preset transport direction.

As disclosed in Japanese Patent No. 3415425, the present applicant has suggested a stopper cylinder in which a locked state produced by the lever member can be released, even when the transport objective is transported in a direction opposite to the predetermined transport direction.

The stopper cylinder has a lock pin portion disposed at the end of the lever member. The lock pin portion engages with a bracket under a rotary action of the lever member. Accordingly, rotary movement of the lever member is regulated, so as to function as a stopper, and thereby halt transport of the transport objective. If the bracket is rotatable, the lock pin portion rotates the bracket while pressing the bracket, thus allowing the lever member to undergo rotary displacement when the transport objective abuts against the lever member and is pressed in a direction opposite to the predetermined transport direction. As a result, the lock pin portion disengages from the bracket, so as to release the regulated state of the lever member effected by the bracket. Accordingly, the transport objective can be transported in a direction opposite to the predetermined transport direction.

SUMMARY OF THE INVENTION

A principal object of the present invention is to provide a stopper cylinder, which can transport a workpiece without fastening the workpiece, even when external forces are applied in a direction opposite to the transport direction of the workpiece, and which can mitigate loads exerted by such external forces on the lock mechanism.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
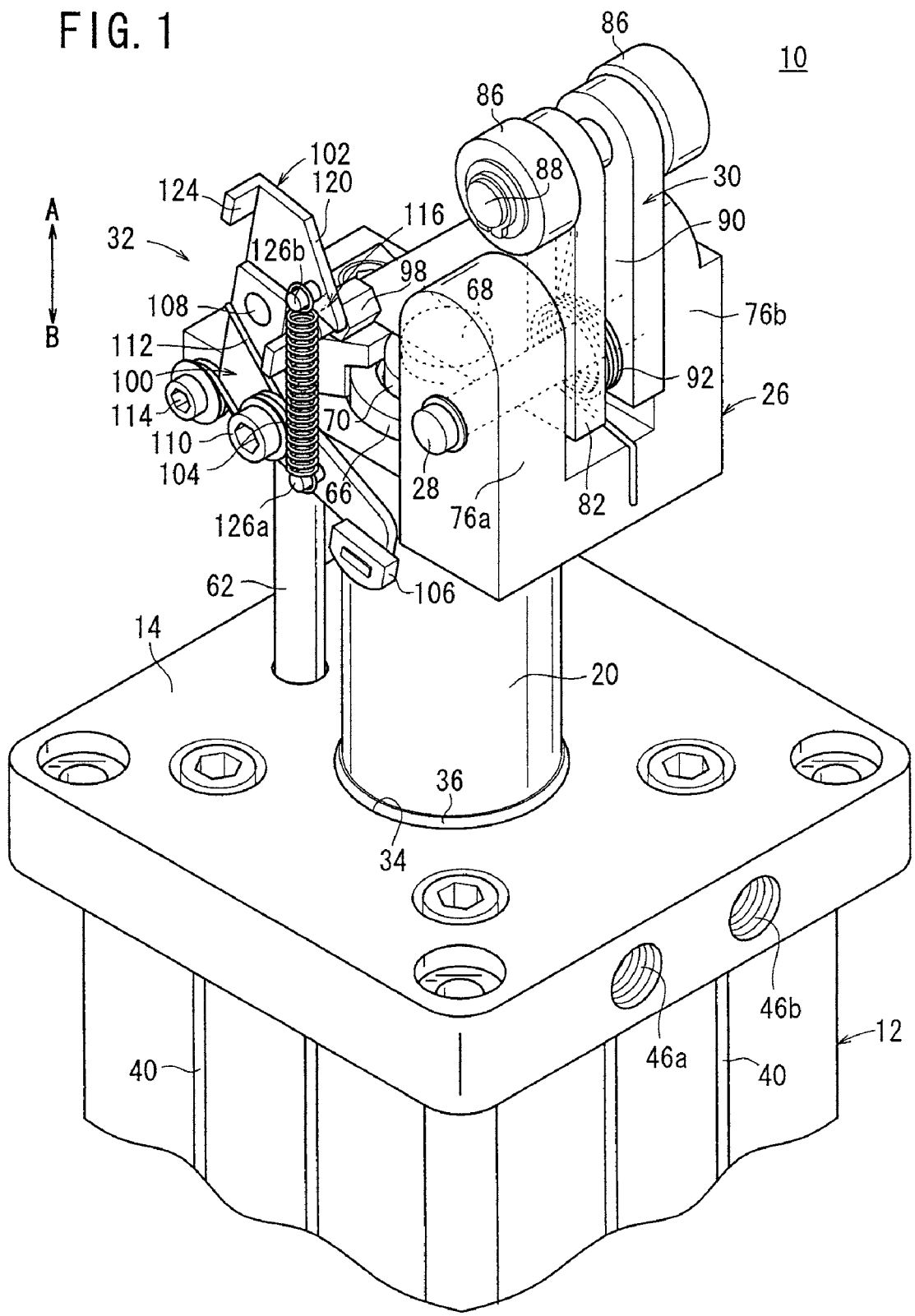
FIG. 1 is a magnified perspective view illustrating an upper portion of a stopper cylinder according to an embodiment of the present invention.
Figure 2:
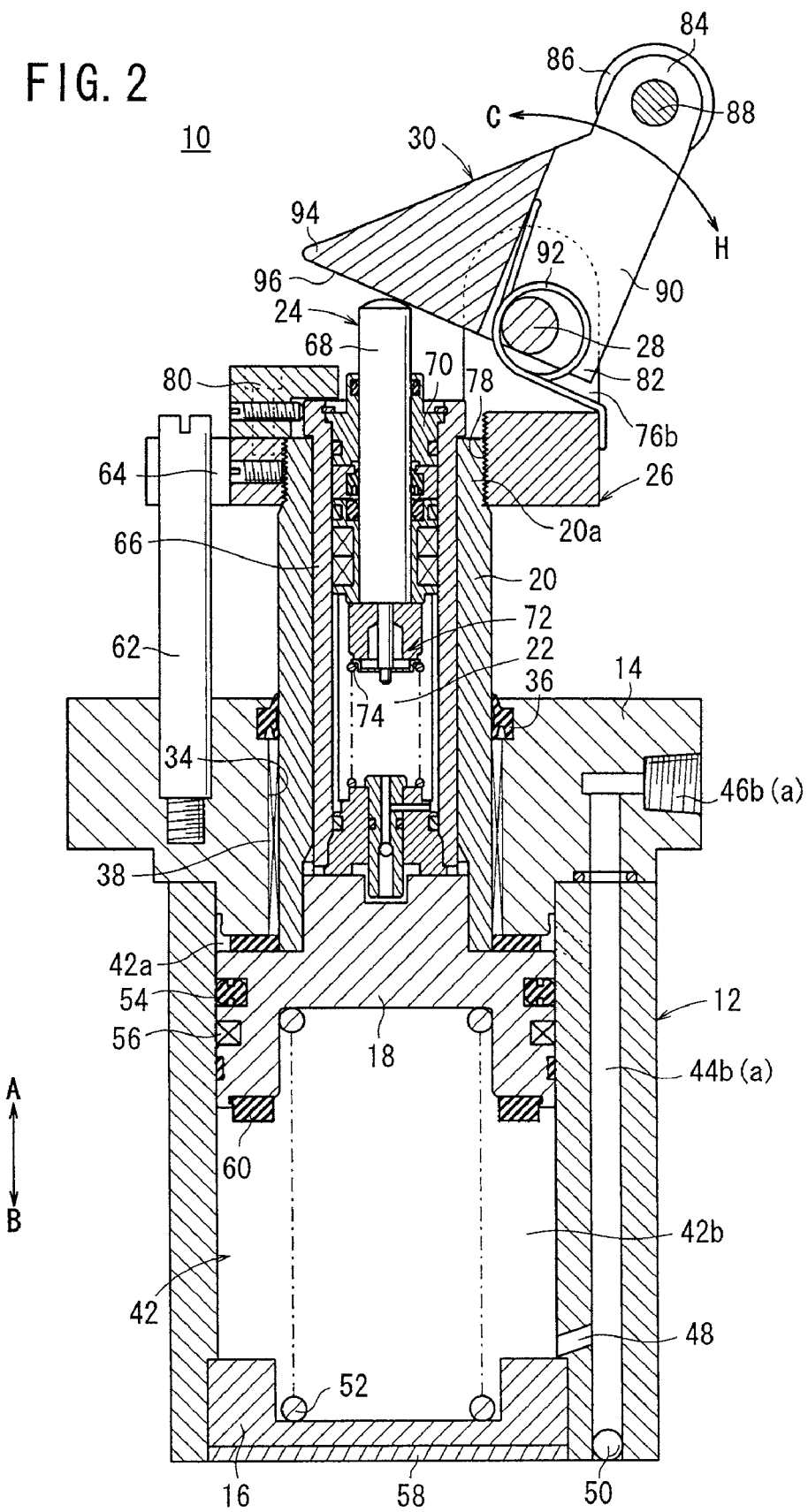
FIG. 2 is a vertical sectional view illustrating the entire stopper cylinder shown in FIG. 1.
Figure 3:
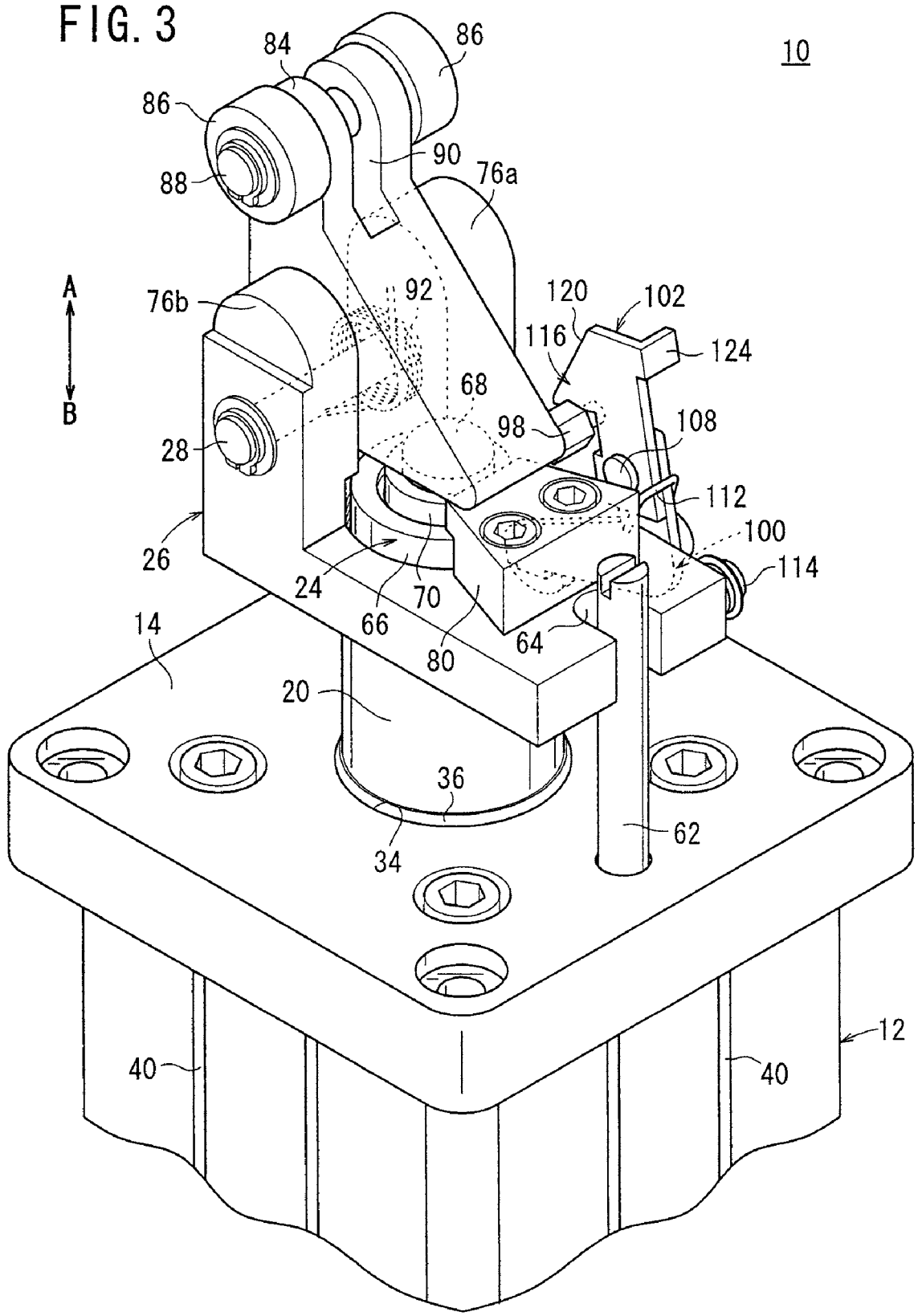
FIG. 3 is a magnified perspective view illustrating an upper portion of the stopper cylinder shown in FIG. 1, as viewed from a different direction.
Figure 4:
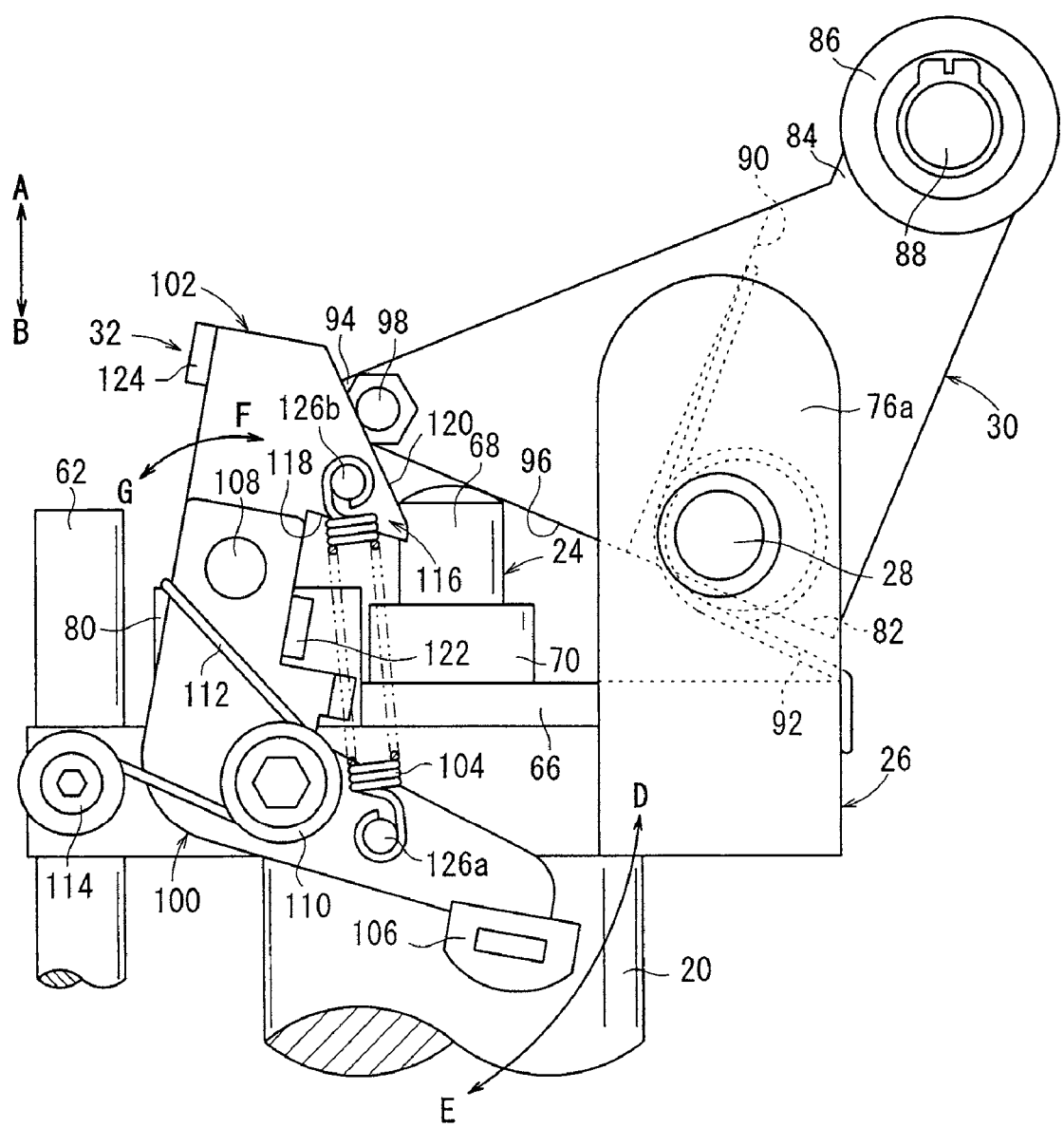
FIG. 4 is a magnified front view illustrating the stopper cylinder shown in FIG. 1.
Figure 5:
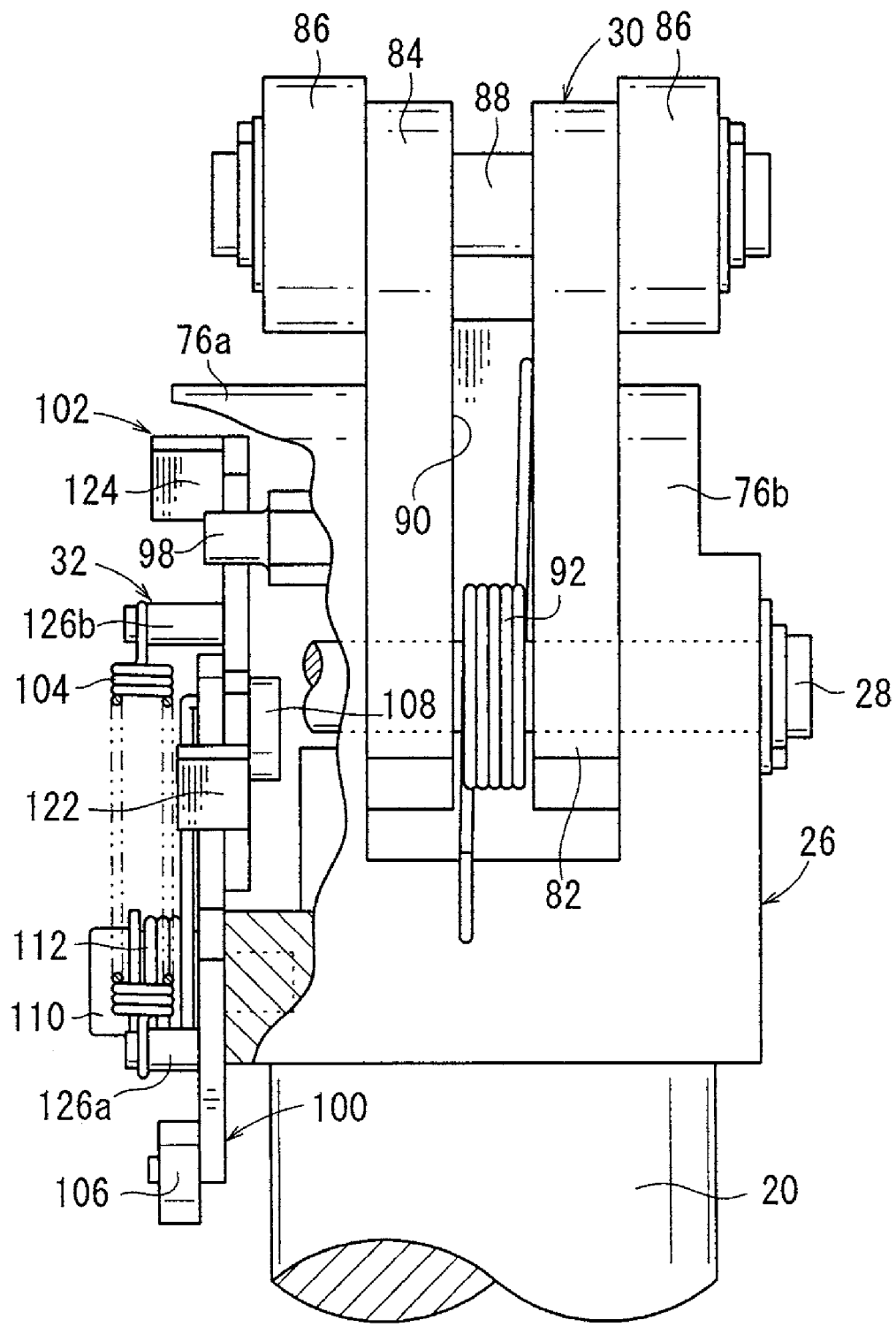
FIG. 5 is a right side view illustrating the stopper cylinder shown in FIG. 4.
Figure 6:
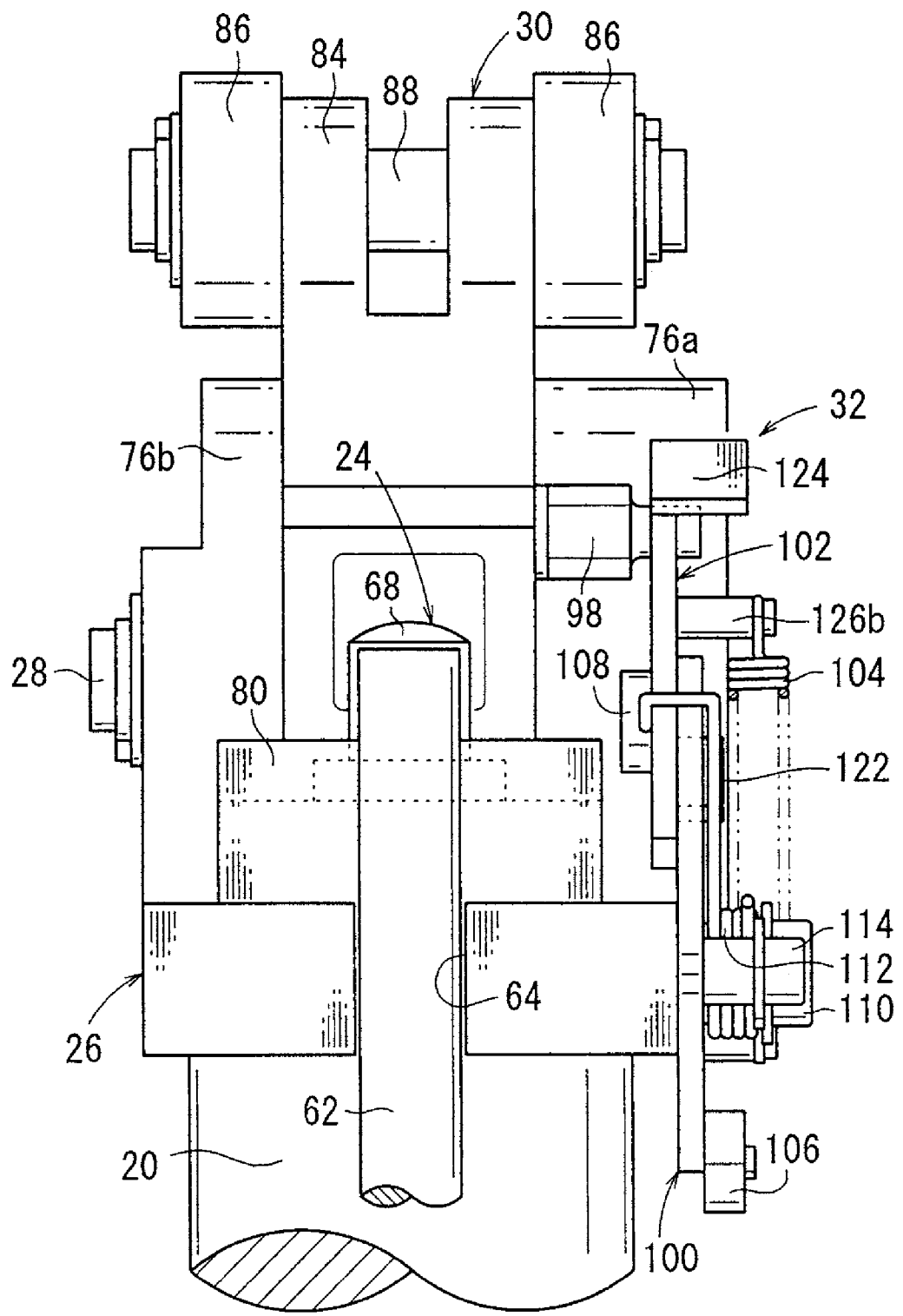
FIG. 6 is a left side view illustrating the stopper cylinder shown in FIG. 4.

In FIG. 1, reference numeral 10 indicates a stopper cylinder according to an embodiment of the present invention.

As shown in FIGS. 1 to 6, the stopper cylinder 10 comprises a cylinder tube (main cylinder body) 12 having a cylindrical shape, a rod cover 14 and a head cover 16 that close openings disposed at respective ends of the cylinder tube 12, and a piston 18 displaceable in an axial direction within the cylinder tube 12.

The stopper cylinder 10 further comprises a piston rod 20, which is connected to the piston 18 so as to be displaceable in an integrated manner therewith, a damper mechanism 24 internally fitted in a space 22 formed in the piston rod 20, a lever holder 26 connected to an upper portion of the piston rod 20, a lever 30 rotatably supported by the lever holder 26 through a lever pin 28, and a lock mechanism 32 that regulates rotary displacement of the lever 30. A portion of the piston rod 20 is exposed to the outside of the cylinder tube 12 via a hole 34, which is substantially in the center of the rod cover 14.

A seal member 36 composed of an elastic material is installed in an annular groove of the hole 34. Further, a cylindrical bush 38 is disposed adjacent to the seal member 36. Specifically, the piston rod 20 is supported by the bush 38 so as to be displaceable in the axial direction. Further, a hermetic condition inside the cylinder tube 12 is maintained by the seal member 36 that abuts against the outer circumferential surface of the piston rod 20.

A pair of sensor attachment grooves 40 are formed in the axial direction on the side surface of the cylinder tube 12. An unillustrated sensor may be installed in the sensor attachment grooves 40, to enable detection of the position of the piston 18 disposed inside the cylinder tube 12.

A pair of passages 44a, 44b, which are distinct from the cylinder chamber 42 having the piston 18 therein, extend in the axial direction of the cylinder tube 12. The passages 44a, 44b extend substantially in parallel and are separated from each other by a predetermined distance. Ends of the passages 44a, 44b communicate with a pair of pressure fluid inlet/outlet ports 46a, 46b formed in the rod cover 14.

One of the passages 44a is connected via an unillustrated communication passage with a first cylinder chamber 42a, which is disposed on an upper side of the piston 18. The other passage 44b is connected via a communication passage 48 to a second cylinder chamber 42b, which is disposed on a lower side of the piston 18. Spherical plugs 50 are inserted respectively into each of the other ends of the passages 44a, 44b in order to close the other ends, which open to the outside.

A spring 52 is interposed in a recess between the piston 18 and the head cover 16. The piston 18 is urged constantly toward the rod cover 14 (in the direction of the arrow A) by a repulsive force of the spring 52. A ring-shaped piston packing 54 and a magnet 56 are installed into annular grooves on the outer circumferential surface of the piston 18.

The following arrangement can also be provided without the spring 52 as described above. More specifically, the piston 18 can be displaced in an axial direction by means of a pressing force exerted only by the pressure fluid supplied to the first and second cylinder chambers 42a and 42b. In such an arrangement, the spring 52 can be dispensed with. Therefore, the arrangement is advantageous in that the number of parts making up the stopper cylinder 10, as well as production costs, can be reduced.

An annular buffer member 60 composed of an elastic material is provided on the lower surface of the piston 18, such that the buffer member 60 faces the head cover 16. When the buffer member 60 abuts against the head cover 16 under a displacement action of the piston 18, impacts applied from the head cover 16 to the piston 18 are buffered.

The head cover 16 is fixed to a bottom surface portion of the cylinder tube 12 by a plate 58, so as to close the bottom surface portion of the cylinder tube 12.

On the other hand, the damper mechanism 24, which is displaceable together with the piston 18, and a guide rod 62 for guiding the lever holder 26, are arranged on upper portions of the rod cover 14. The guide rod 62 is inserted into a guide groove 64 formed in the lever holder 26 so as to guide the lever holder 26 and the other components in the vertical direction (i.e., the direction indicated by arrows A and B).

The damper mechanism 24 includes a cylindrical outer tube 66, which is internally fitted into the space 22 of the piston rod 20, a rod member 68 that is displaceable within the outer tube 66, and a rod guide 70 provided on one end of the outer tube 66 for axially supporting the rod member 68. The damper mechanism 24 may be formed by a pneumatic system or a hydraulic system, for example.

An absorbing mechanism 72, which absorbs impacts applied to the rod member 68, is provided within the outer tube 66. The absorbing mechanism 72 comprises a damper spring 74 pressing the rod member 68 upwardly, and an oil under pressure (not shown) that fills the closed space.

Specifically, when the rod member 68 constituting the damper mechanism 24 is pressed toward the cylinder tube 12 (in the direction of the arrow B) under a rotary action of the lever 30, the rod member 68 is displaced integrally under a guiding action by the rod guide 70, while opposing the repulsive force of the damper spring 74 as well as the pressure imposed by the pressurized oil. Therefore, impacts exerted when the lever 30 is rotated are buffered appropriately.

The lever holder 26 has a substantially L-shaped cross section, which is connected via threading with a screw section 20a of the piston rod 20. A pair of support sections 76a, 76b are provided for the lever holder 26, the support sections 76a, 76b being separated by a predetermined distance. The lever 30 arranged between the pair of support sections 76a, 76b is rotatably supported by the lever pin 28. An insertion hole 78, into which the damper mechanism 24 is inserted, is formed in a substantially central portion of the lever holder 26. A portion of the rod member 68 that constitutes the damper mechanism 24 is exposed to the outside through the insertion hole 78.

A stopper block 80 is installed in the lever holder 26 at a position disposed on a side opposite to the support sections 76a, 76b about the center of the insertion hole 78. The stopper block 80 regulates the rotation angle of the lever 30. The guide groove 64 is formed in the vicinity of the stopper block 80, into which the guide rod 62 is inserted.

The lever 30 has a substantially triangular cross section. A first corner 82, formed at a substantially central portion thereof, is rotatably supported by the support sections 76a, 76b of the lever holder 26 through the lever pin 28. A second corner 84 protrudes upwardly from the first corner 82. A pair of rollers 86 having substantially semicircular shapes are rotatably supported by the second corner 84. The rollers 86 are supported coaxially and rotatably through a roller pin 88 that is inserted into the second corner 84.

The lever 30 has a recessed groove 90, which extends from the first corner 82 to the second corner 84. The recessed groove 90 is recessed a substantially constant depth from the side surface of the lever 30. Further, the recessed groove 90 is formed in a straight line, in a direction oriented from the first corner 82 to the second corner 84 (see FIG. 2).

More specifically, the recessed groove 90 extends in a direction substantially perpendicular to the roller pin 88 and the lever pin 28 inserted into the lever 30. Portions of the lever pin 28 and the roller pin 88, respectively, are exposed through the recessed groove 90.

A first return spring 92 is wound around the lever pin 28 and arranged inside the recessed groove 90. One end of the first return spring 92 is fastened to a side surface of the lever holder 26, and the other end thereof engages with the inner wall surface of the recessed groove 90. The lever 30 is urged by a repulsive force of the first return spring 92 such that the lever 30 rotates in a direction (direction of the arrow C) approaching the damper mechanism 24, about the center of the lever pin 28.

On the other hand, the lever 30 extends from the first corner 82 facing the lever holder 26, and a third corner 94 is formed at the forward end thereof. The lever 30 has a substantially right-angled triangular cross section, wherein one side surface thereof that includes the recessed groove 90, which extends toward the second corner 84 about the center of the first corner 82, is substantially perpendicular to a flat surface section 96, which extends from the first corner 82 toward the third corner 94 (see FIG. 2). When the lever 30 is rotated so as to approach the lever holder 26, the rod member 68 of the damper mechanism 24 is pressed by the flat surface section 96 of the lever 30.

When the flat surface section 96 abuts against the stopper block 80 installed on the lever holder 26 upon rotation of the lever 30, rotational displacement of the lever 30 toward the damper mechanism 24 is regulated. The height of the stopper block 80 is set such that the flat surface section 96 remains substantially in parallel to the upper surface of the lever holder 26, when the lever 30 comes into abutment therewith.

A lock pin 98, which engages with the lock mechanism 32 as described later on, is provided on a side portion of the lever 30. The lock pin 98 is disposed substantially in parallel to the lever pin 28, which is connected to and protrudes a predetermined length from the side surface of the lever 30. When the lever 30 is rotated and displaced by the lock mechanism 32 so as to engage the lock pin 98, rotational displacement of the lever 30 is regulated.

The lock mechanism 32 is disposed on a side surface of the lever holder 26 facing the lock pin 98 of the lever 30. The lock mechanism 32 includes a first bracket (first rotary member) 100 rotatably supported by the lever holder 26 through a bolt 110, a second bracket (second rotary member) 102 rotatably supported with respect to the first bracket 100, and a lock spring (spring) 104 interposed between the first bracket 100 and the second bracket 102.

The first bracket 100 is formed from a plate member with a substantially L-shaped form. A substantially central portion thereof, which is bent, is supported with respect to the lever holder 26. One end of the first bracket 100 faces a side surface of the lever holder 26, which is arranged on the side of the rod cover 14. An unlocking section 106 is provided, which abuts against the upper surface of the rod cover 14.

The unlocking section 106 is formed from a resin material, for example, which is installed so as to cover one end of the first bracket 100. When the first bracket 100 is displaced toward the rod cover 14 (in the direction of the arrow B) together with the lever holder 26 due to displacement of the piston 18, the unlocking section 106 abuts against the upper surface of the rod cover 14, whereupon the first bracket 100 is rotated in a counterclockwise direction (in the direction of the arrow D shown in FIG. 4) about the center of the bolt 110.

The other end of the first bracket 100 extends from the bent substantially central portion upwardly in the vertical direction. The second bracket 102 is supported rotatably through a bracket pin 108.

A second return spring 112 wound around the bolt 110 is arranged between the first bracket 100 and the bolt 110. One end of the second return spring 112 engages with a side surface of the first bracket 100, while the other end thereof engages with a fastening bolt 114 that is threaded into the side surface of the lever holder 26. Accordingly, a repulsive force of the second return spring 112 urges the first and second brackets 100, 102 so as to be integrally rotated in a clockwise direction (direction of the arrow E shown in FIG. 4) about the center of the bolt 110.

One end of the second bracket 102 is rotatably supported by the bracket pin 108, while overlapping the other end of the first bracket 100. A lock pawl (engaging section) 116, bent in a substantially perpendicular direction, is formed at the other end of the second bracket 102, extending in a straight line from the one end.

The lock pawl 116 protrudes toward the support sections 76a, 76b of the lever holder 26, which gradually is tapered in a direction oriented toward a forward end thereof. The lock pawl 116 comprises a perpendicular surface (perpendicular section) 118, which is bent substantially perpendicularly with respect to one end of the second bracket 102, and a guide surface (inclined section) 120 inclined at an angle of inclination that gradually increases from the forward end of the lock pawl 116.

A perpendicular surface 118 is formed on the lower side of the lock pawl 116 facing the first bracket 100. The guide surface 120 is formed on the upper side thereof, so that the lock pin 98 can abut against the guide surface 120.

A first fastening tab 122 protrudes toward the overlapping first bracket 100 at one end of the second bracket 102. The first fastening tab 122 engages with the other end of the first bracket 100. In particular, the first fastening tab 122 engages with one side surface of the first bracket 100, which is disposed in a protruding direction of the lock pawl 116. Thus, the other end of the first bracket 100 and one end of the second bracket 102 are arranged along a straight line, such that they are rotatably supported by the bracket pin 108. Accordingly, relative rotational displacement of the second bracket 102 is regulated in a clockwise direction (direction of the arrow F shown in FIG. 4) with respect to the first bracket 100.

A second fastening tab 124 is formed at the other end of the second bracket 102, wherein the second fastening tab 124 protrudes in the same direction as the first fastening tab 122. When the second bracket 102 is rotated about the center of the bracket pin 108, the second fastening tab 124 abuts against the other side surface of the first bracket 100. Thus, rotational displacement of the second bracket 102 is regulated at a predetermined angle in the counterclockwise direction (direction of the arrow G shown in FIG. 4) with respect to the first bracket 100. In other words, the first and second fastening tabs 122 and 124 function as stoppers, in order to regulate within a predetermined angle the angle of rotation of the second bracket 102 with respect to the first bracket 100.

The lock spring 104 is interposed between a pin 126a provided on one end of the first bracket 100 and a pin 126b The pins 126a, 126b protrude in a direction away from the lever 30, in the same direction as that of the first and second fastening tabs 122, 124 respectively.

The lock spring 104 comprises a tension spring, such as a coil spring, for example. The lock spring 104 urges one end of the first bracket 100 and the lock pawl 116 of the second bracket 102 in directions so as to approach one another. With this arrangement, relative rotational displacement of the second bracket 102 is regulated by the first fastening tab 122, in a clockwise direction (direction of the arrow F) with respect to the first bracket 100. Therefore, the other end of the first bracket 100 and one end of the second bracket 102 are maintained such that they are disposed along a straight line.

The lock mechanism 32 has a substantially U-shaped form, in which one end of the first bracket 100 and the lock pawl 116 of the second bracket 102 protrude toward the support sections 76a, 76b of the lever holder 26, in substantially identical directions parallel to each other.

The stopper cylinder 10 in accordance with the embodiment of the present invention is basically constructed as described above. Next, operations, functions and effects thereof shall be explained.

Figure 7:
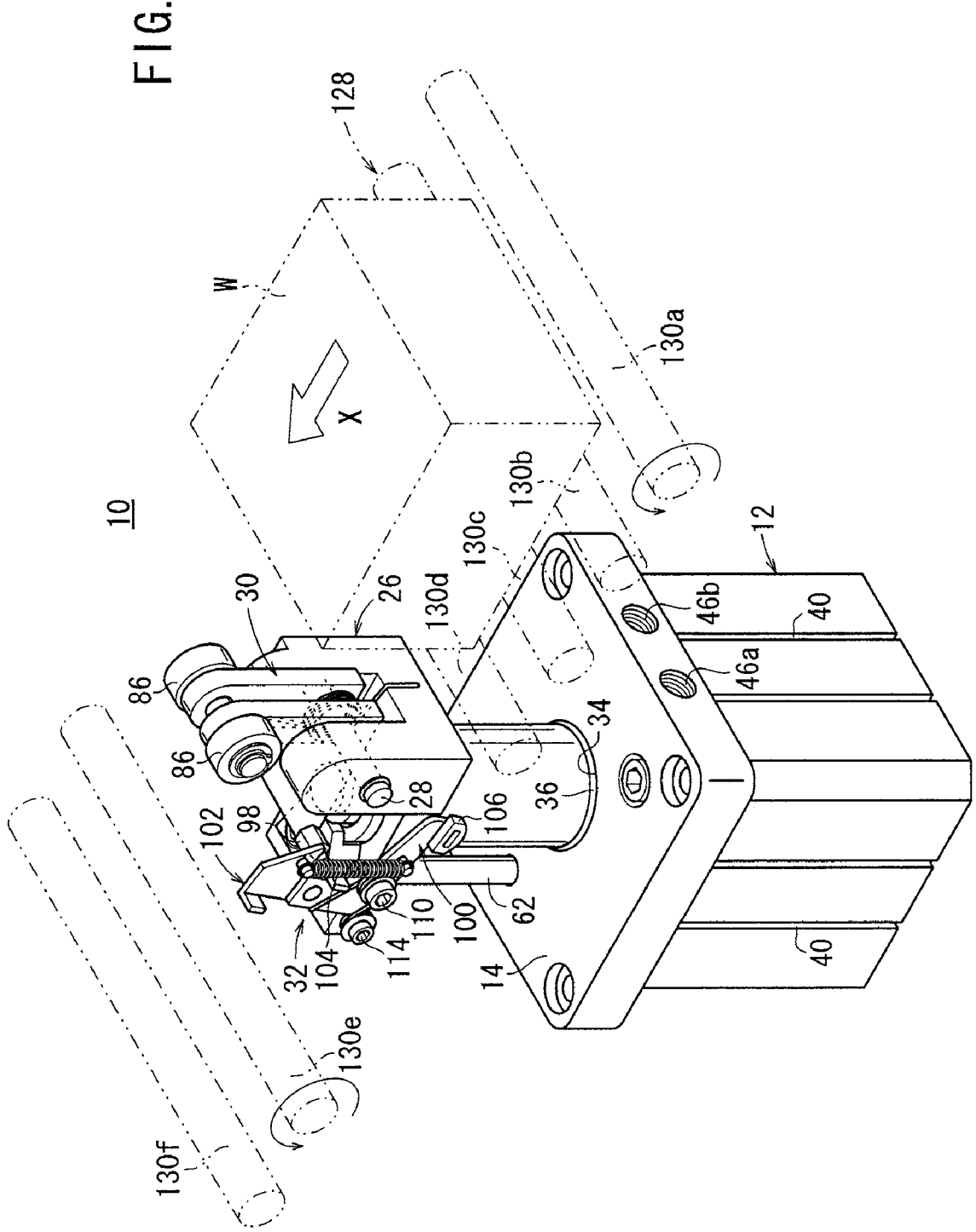
FIG. 7 is a schematic perspective view illustrating an arrangement of a transport line, in which the stopper cylinder is disposed between a plurality of roller conveyors.

At first, as shown in FIG. 7, the stopper cylinder 10 is arranged and fixed such that the rollers 86 are positioned in the gap between adjoining roller conveyors 130d and 130e of the plural roller conveyors 130a to 130f that make up the transport line 128. Starting from the state described above, the roller conveyors 130a to 130f are rotated under an urging action of an unillustrated rotary driving source, so that the workpiece W, which is placed on the pallet P (see FIG. 8), is transported in the direction of the arrow X. The pallet P, on which the workpiece W is placed, has been omitted from illustration in FIG. 7.

A pressure fluid supply source (not shown) is connected beforehand, via an unillustrated tube or the like, to one pressure fluid inlet/outlet port 46b of the stopper cylinder 10.

When pressure fluid is supplied from the unillustrated pressure fluid supply source to the pressure fluid inlet/outlet port 46b, the pressure fluid is introduced into the second cylinder chamber 42b via the passage 44b, and the piston 18 is displaced toward the rod cover 14 (in the direction of the arrow A) under a pressing action exerted by the pressure fluid. In this situation, a repulsive force from the spring 52 is applied to the piston 18 toward the rod cover 14 (in the direction of the arrow A).

Figure 8:
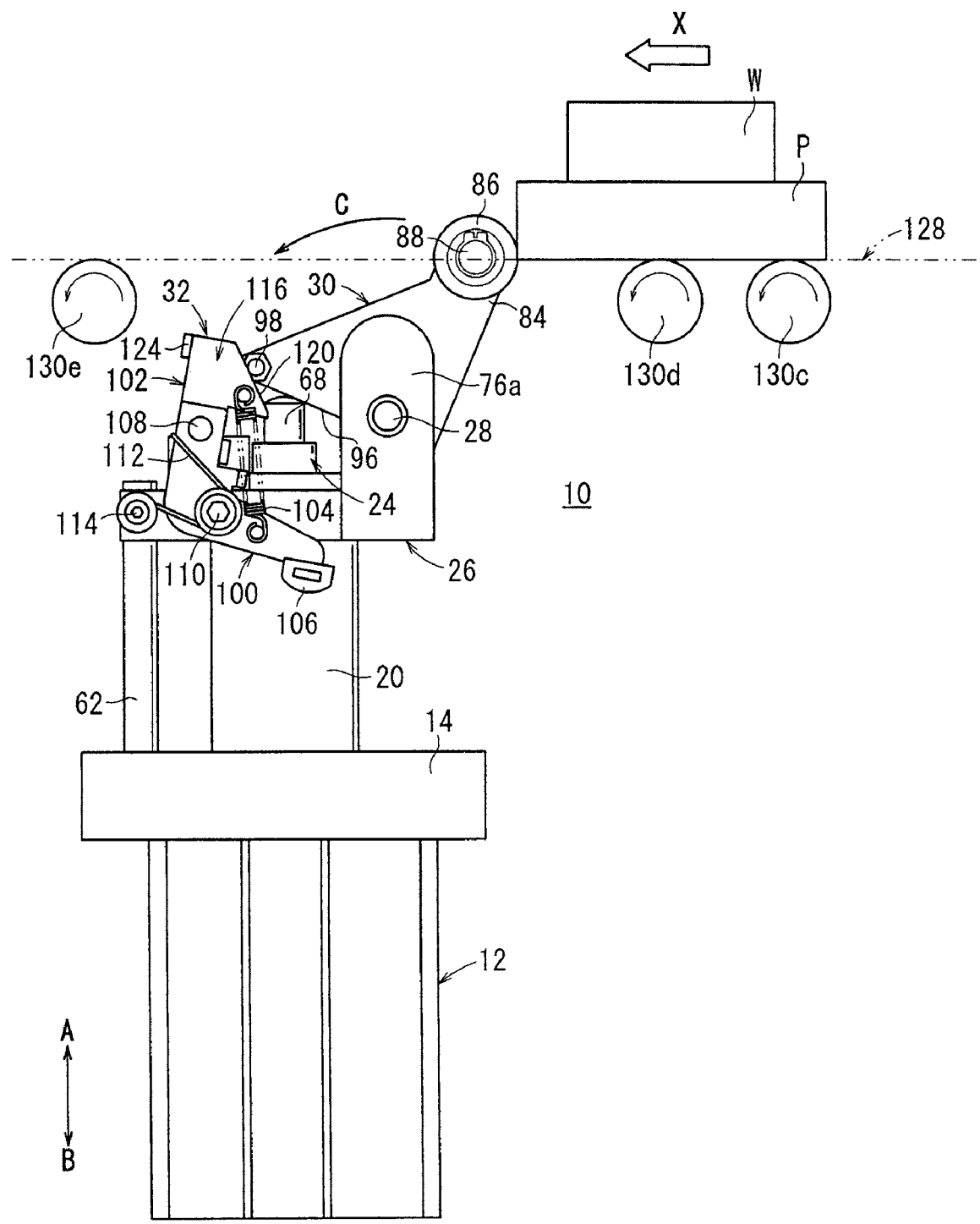
FIG. 8 is a schematic front view illustrating a case in which a workpiece is transported in a predetermined transport direction along the transport line shown in FIG. 7.

In this situation, the damper mechanism 24 contained within the space 22 of the piston rod 20 is moved upwardly integrally with the piston 18, thereby providing a waiting state in which the rollers 86 rotatably supported by the second corner 84 of the lever 30 protrude a predetermined length beyond the roller conveyors 130d, 130e (see FIG. 8).

The following explanation shall be made, assuming that the waiting state shown in FIG. 8 forms an initial position. In this state, the lock mechanism 32 is released from its lock state, in which the lock pin 98 abuts against the guide surface 120 of the second bracket 102.

Starting from the aforementioned waiting state, the workpiece W contacts the rollers 86 disposed at the forward ends of the lever 30, during a period in which the workpiece W is transported on the pallet P in the direction of the arrow X by means of the roller conveyors 130c, 130d, 130e (see FIG. 8). In this situation, the flat surface section 96 of the lever 30 is rotated a predetermined angle about the support point of the lever pin 28, in a direction (direction of the arrow C) so as to approach the cylinder tube 12. The rod member 68 of the damper mechanism 24 is pressed toward the cylinder tube 12 (in the direction of the arrow B). Accordingly, impacts exerted when the workpiece W makes contact are absorbed by the damper mechanism 24. Further, the lever 30 is retained in a locked state, perpendicular to the transport direction (direction of the arrow X) (see FIG. 9).

Specifically, the lever 30 is pressed in the transport direction (direction of the arrow X) by a pressing force of the workpiece W. The third corner 94 of the lever 30 is rotated and displaced in a direction approaching the lever holder 26. As a result, the rod member 68 of the damper mechanism 24 is pressed downwardly by the flat surface section 96 of the lever 30.

In this situation, the lock pin 98 provided on the lever 30 is displaced along the guide surface 120 of the lock pawl 116 making up the second bracket 102, under a rotary action of the lever 30. The lock pin 98 reaches the forward end of the guide surface 120, whereupon the lock pin 98 engages with the perpendicular surface 118 of the lock pawl 116.

Figure 9:
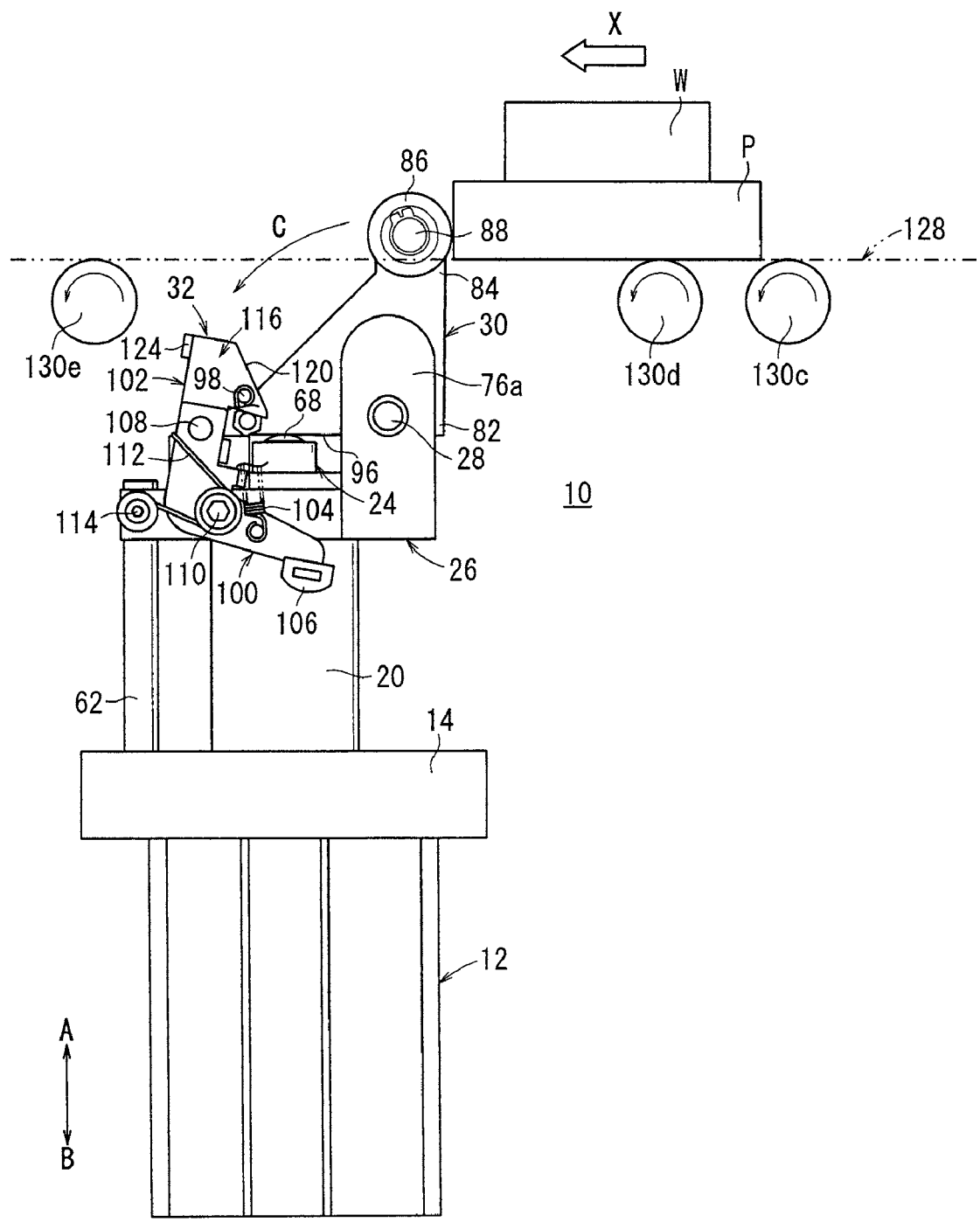
FIG. 9 is a schematic front view illustrating a locked state in which a pallet, on which the workpiece shown in FIG. 8 is placed, contacts the lever of a stopper cylinder, wherein the lever is rotated so that a lock pin thereof engages with a lock mechanism.

As a result, a locked state is provided in which rotary action of the lever 30 is regulated by the lock mechanism 32 including the lock pin 98 (see FIG. 9). The second bracket 102 is pulled and tensioned by the repulsive force of the lock spring 104, such that the lock pawl 116 approaches one end of the first bracket 100. Therefore, the second bracket 102 is not rotated or displaced with respect to the first bracket 100, so that the second bracket 102 maintains the state of engagement of the lock pin 98.

Accordingly, the lever 30 is fastened such that the rod member 68 of the damper mechanism 24 is pressed downwardly. Further, the lever 30 is locked in an upstanding state by means of the lock pin 98, which engages with the lock pawl 116 of the second bracket 102. In this way, the lever 30 is retained in a substantially perpendicular state with respect to the transport direction of the workpiece W (direction of the arrow X). Accordingly, the workpiece W is prevented from being pushed and returned in a direction opposite to the transport direction, by means of a buffering force of the damper mechanism 24. Further, the workpiece W can be smoothly stopped at a predetermined position.

Figure 10:
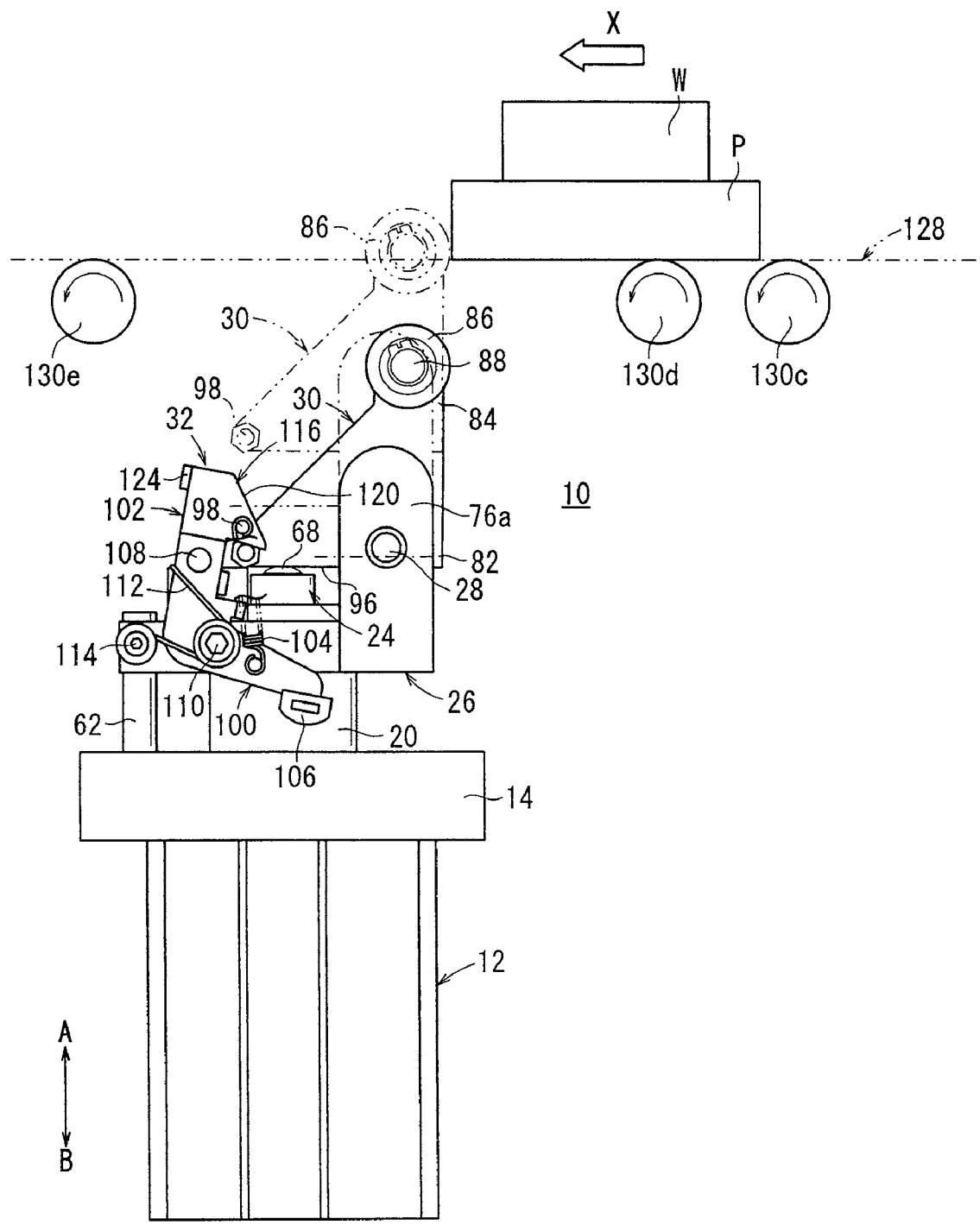
FIG. 10 is a schematic front view illustrating a state in which transporting of the workpiece is stopped by the lever shown in FIG. 9, whereupon a damper mechanism and a lever holder including the lever are integrally displaced downwardly.
Figure 11:
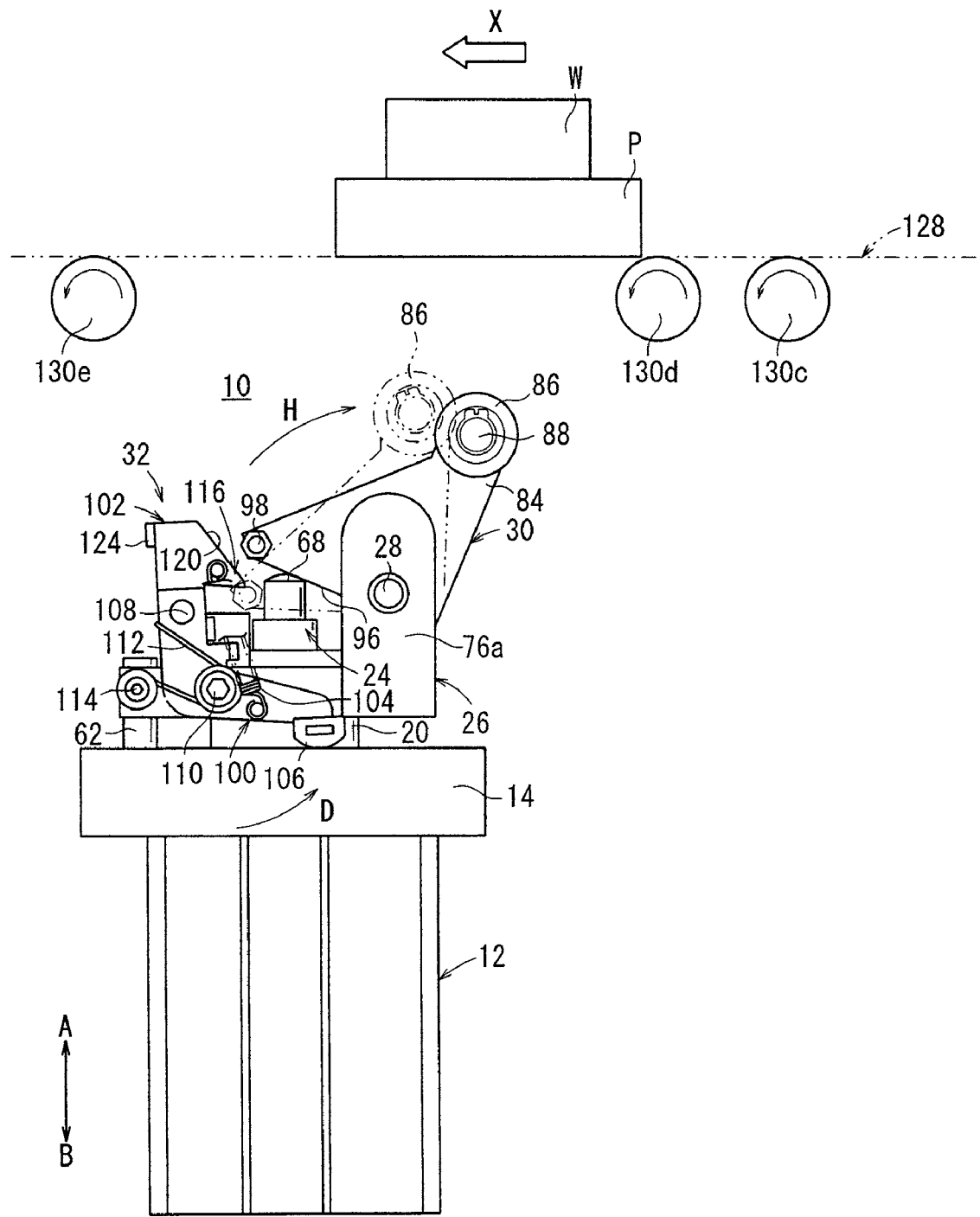
FIG. 11 is a schematic front view illustrating a state in which an unlocking section of the lock mechanism shown in FIG. 10 abuts against a rod cover, whereupon the lever is released from a locked state so that the lever can be rotated by a predetermined angle.

Subsequently, the pressure fluid is supplied from one pressure fluid inlet/outlet port 46b to the other inlet/outlet port 46a, by switching an unillustrated directional control valve, whereupon the pressure fluid is introduced into the first cylinder chamber 42a via the passage 44a. Accordingly, the piston 18 is displaced toward the head cover 16 (in the direction of the arrow B) in an opposite direction to that described above. The damper mechanism 24 is moved downwardly integrally together with the piston 18 against the repulsive force of the spring 52 (see FIG. 10). The rollers 86 are positioned on a lower side, a predetermined distance from the transport line 128 of the workpiece W, at a stroke terminal end position of the piston 18, as shown in FIG. 11. Further, the unlocking section 106 of the first bracket 100 making up the lock mechanism 32 abuts against the upper surface of the rod cover 14, and the unlocking section 106 is pressed toward the lever holder 26 (in the direction of the arrow A).

As a result, the first bracket 100 is rotated about the center of the bolt 110 and displaced a predetermined angle in a counterclockwise direction. Accordingly, the second bracket 102 is rotated and displaced together with the first bracket 100.

Accordingly, the lock pin 98 is released from its state of engagement effected by the second bracket 102. The lever 30 is rotated by means of the damper mechanism 24 and is displaced in a clockwise direction (direction of the arrow H), so as to separate from the lock mechanism 32, about the center of the lever pin 28. Further, the flat surface section 96 of the lever 30 separates from the rod member 68 of the damper mechanism 24, whereupon the lever 30 is released from its locked state (see FIG. 11). When the lever 30 is released from its locked state, the rod member 68 of the damper mechanism 24 moves upwardly in an integrated manner and is restored to its initial position.

Subsequently, pressure fluid is reintroduced into the second cylinder chamber 42b via one pressure fluid inlet/outlet port 46b and the passage 44b, by switching an unillustrated directional control valve, in a state in which the lever 30 is released from its lock state effected by the lock mechanism 32. The piston 18 then is displaced toward the rod cover 14 (in the direction of the arrow A).

Figure 12:
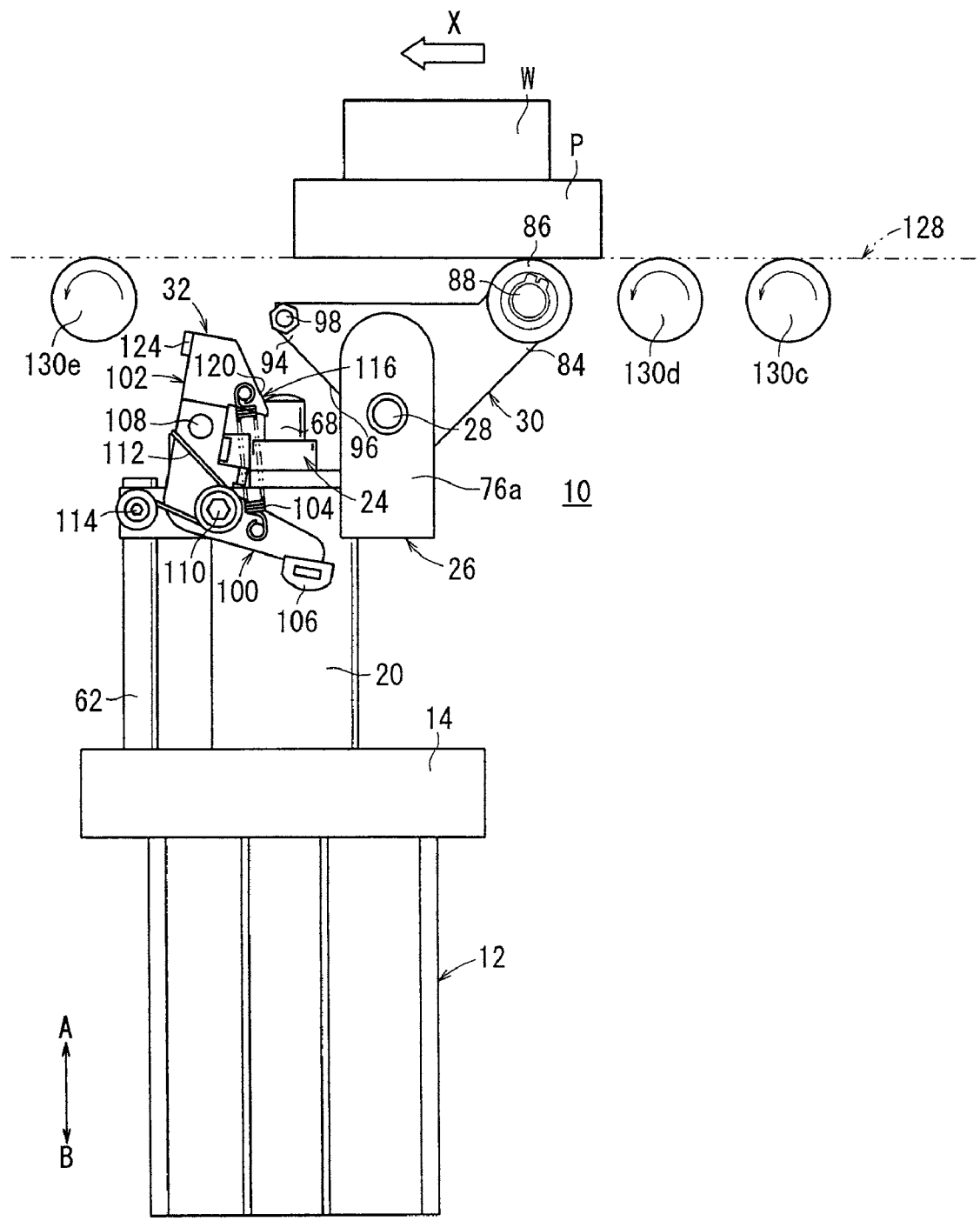
FIG. 12 is a schematic front view illustrating a state in which the lever and the damper mechanism shown in FIG. 11 are moved upward integrally so as to allow rollers of the lever to abut against a lower surface of the pallet, whereupon the lever is further rotated and displaced.

Accordingly, the damper mechanism 24 and the lever holder 26 including the lever 30 are moved upward integrally toward the workpiece W. The rollers 86 provided on the lever 30 abut against the bottom surface portion of the pallet P, on which the workpiece W is placed and transported by the roller conveyors 130c, 130d, 130e. Simultaneously, rotational displacement is performed so that the second corner 84 and the third corner 94 of the lever 30 are positioned so as to lie substantially horizontally to the transport direction of the workpiece W (direction of the arrow X) (see FIG. 12).

Figure 13:
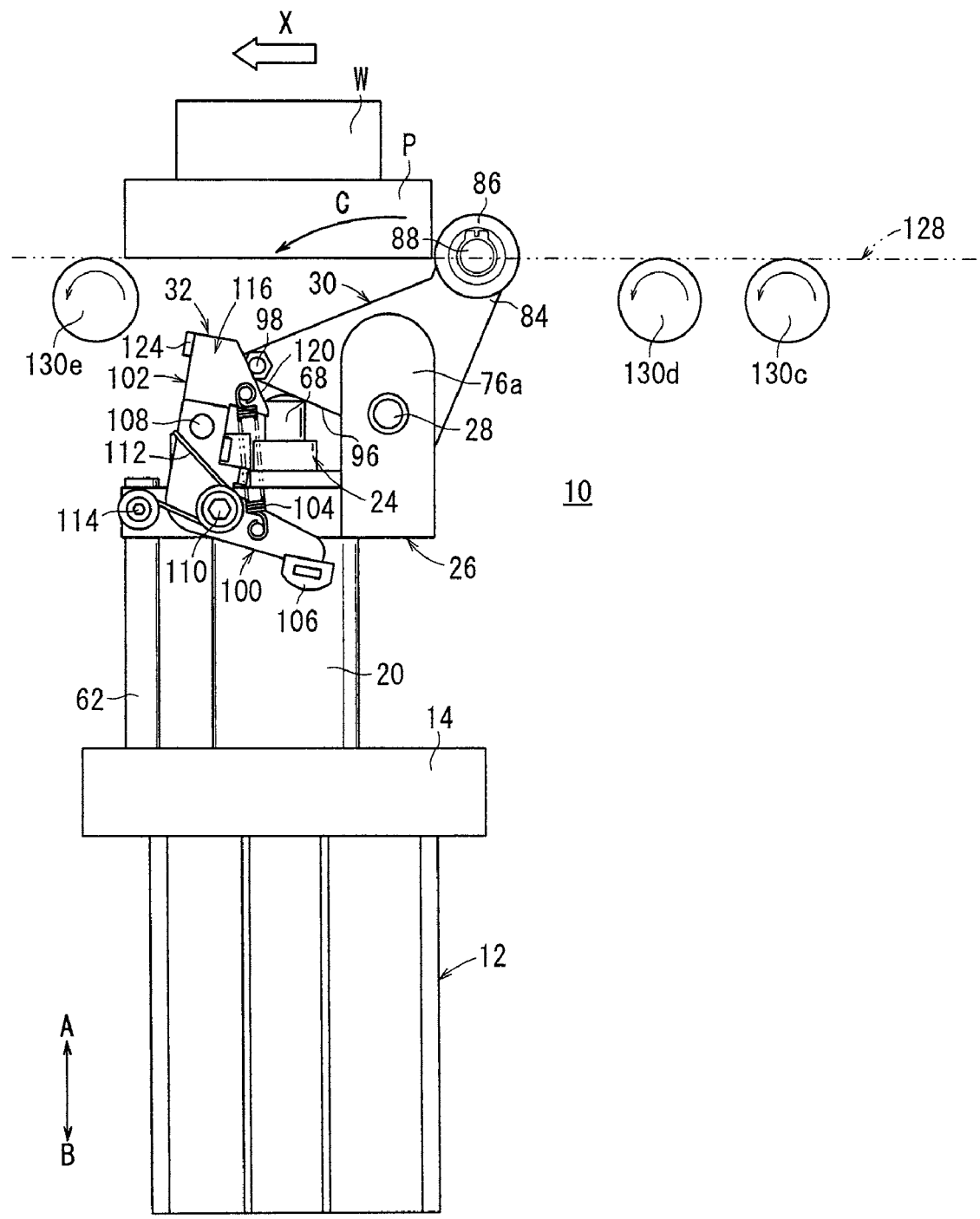
FIG. 13 is a schematic front view illustrating a state in which the workpiece shown in FIG. 12 is further transported, such that the workpiece and the lever do not contact each other, and thus the lever is rotated in an opposite direction by means of a repulsive force of a first return spring, whereupon the stopper cylinder is restored to its initial position.

Therefore, the workpiece W is transported in a predetermined direction along the roller conveyors 130c, 130d, 130e and the rollers 86. As shown in FIG. 13, the pallet P with the workpiece W thereon passes over upper portions of the rollers 86, whereupon the lever 30 is rotated and displaced in a counterclockwise direction (direction of the arrow C) due to the repulsive force of the first return spring 92 that is wound around the lever pin 28. Accordingly, the lever 30 is restored to its initial position in an unlocked state.

Next, an explanation will be made, with reference to FIGS. 14 to 17, concerning a case in which an operator manually moves the workpiece W in a direction opposite to the preset transport direction of the workpiece W, during an adjusting operation performed before automating the transport line 128 and after constructing the transport line 128 by installing the plural conveyors 130a to 130f. In this case, as shown in FIG. 14, it is assumed that the stopper cylinder 10 assumes a state such that the rollers 86 provided on the lever 30 protrude a predetermined length from the transport line 128 of the roller conveyors 130a to 130f, and wherein the lever 30 is locked by the lock mechanism 32 by means of the lever pin 28.

Figure 14:
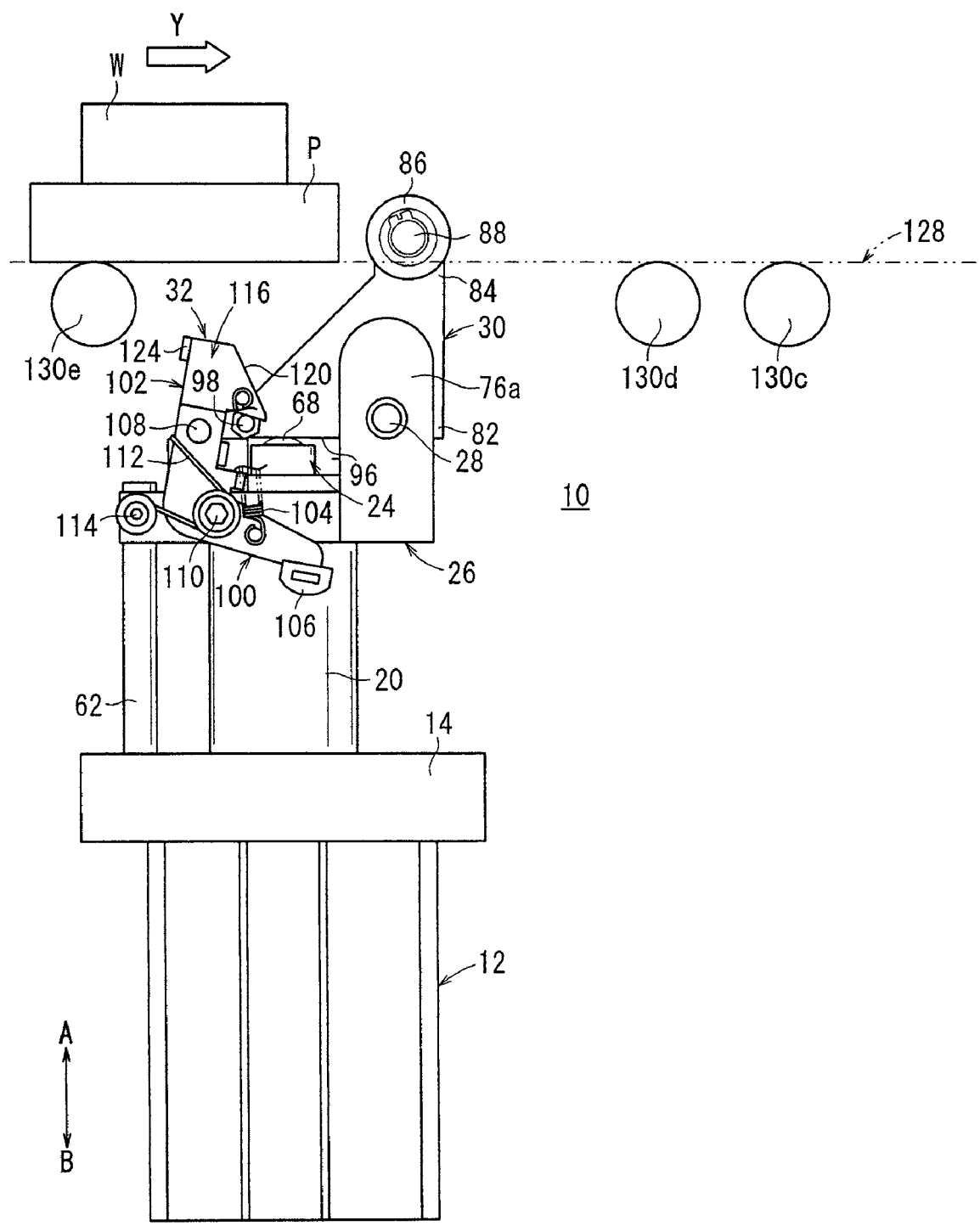
FIG. 14 is a schematic front view illustrating a case in which the workpiece is transported in a direction opposite to the predetermined transport direction along a transport line that is composed of a plurality of roller conveyors.

Starting from the state described above, when the workpiece W is transported together with the pallet P in a direction (direction of the arrow Y) opposite to the predetermined transport direction shown in FIG. 14, the pallet P abuts against the rollers 86, and thereby presses the lever 30 through the rollers 86. The lever 30 is rotated in a clockwise direction (direction of the arrow H) about the center of the lever pin 28, as a result of the pressing force applied to the lever 30 (see FIG. 15).

Figure 15:
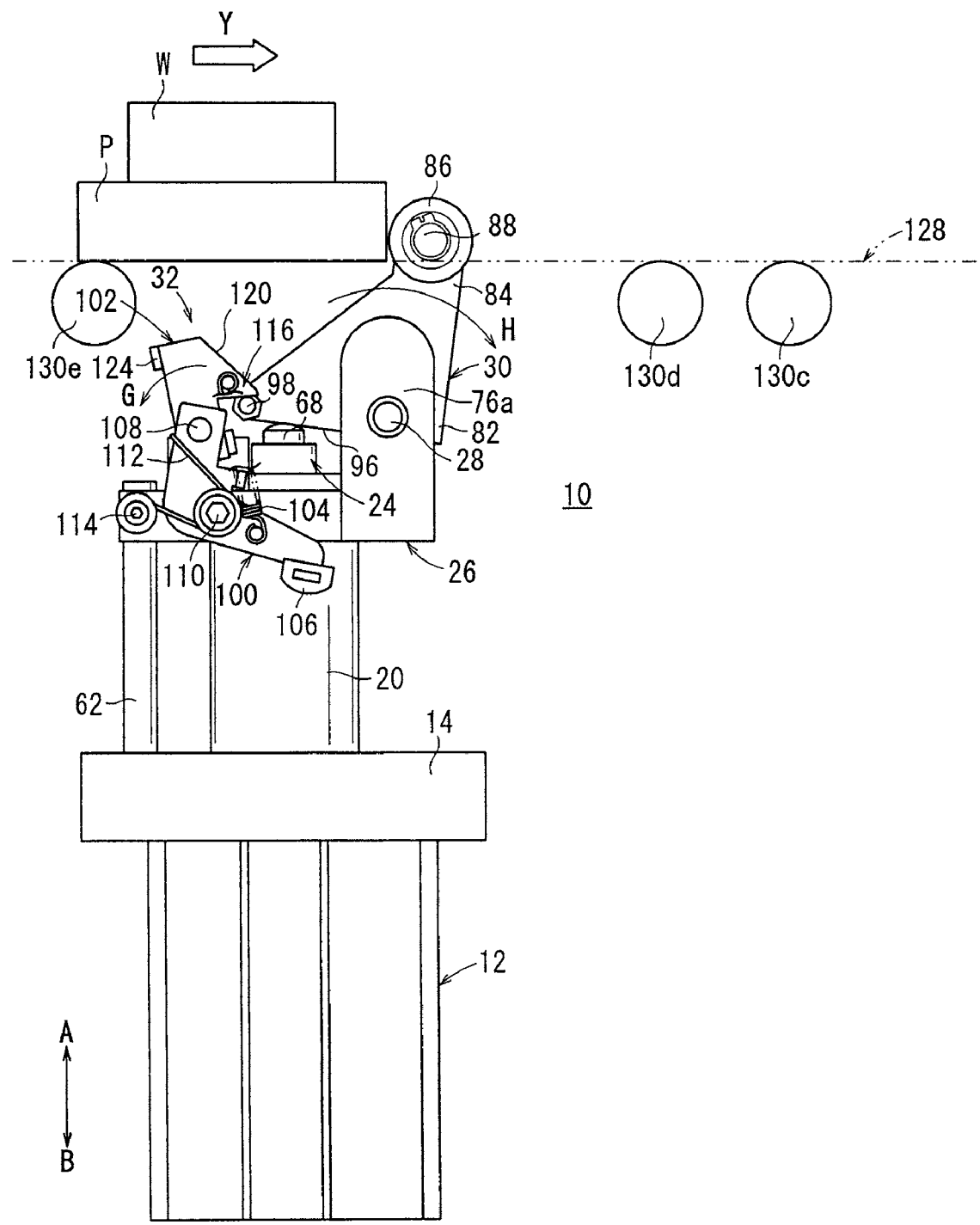
FIG. 15 is a schematic front view illustrating a state in which a pallet, on which the workpiece shown in FIG. 14 is placed, contacts the lever of the stopper cylinder, whereupon the lever is rotated by a predetermined angle.
Figure 16:
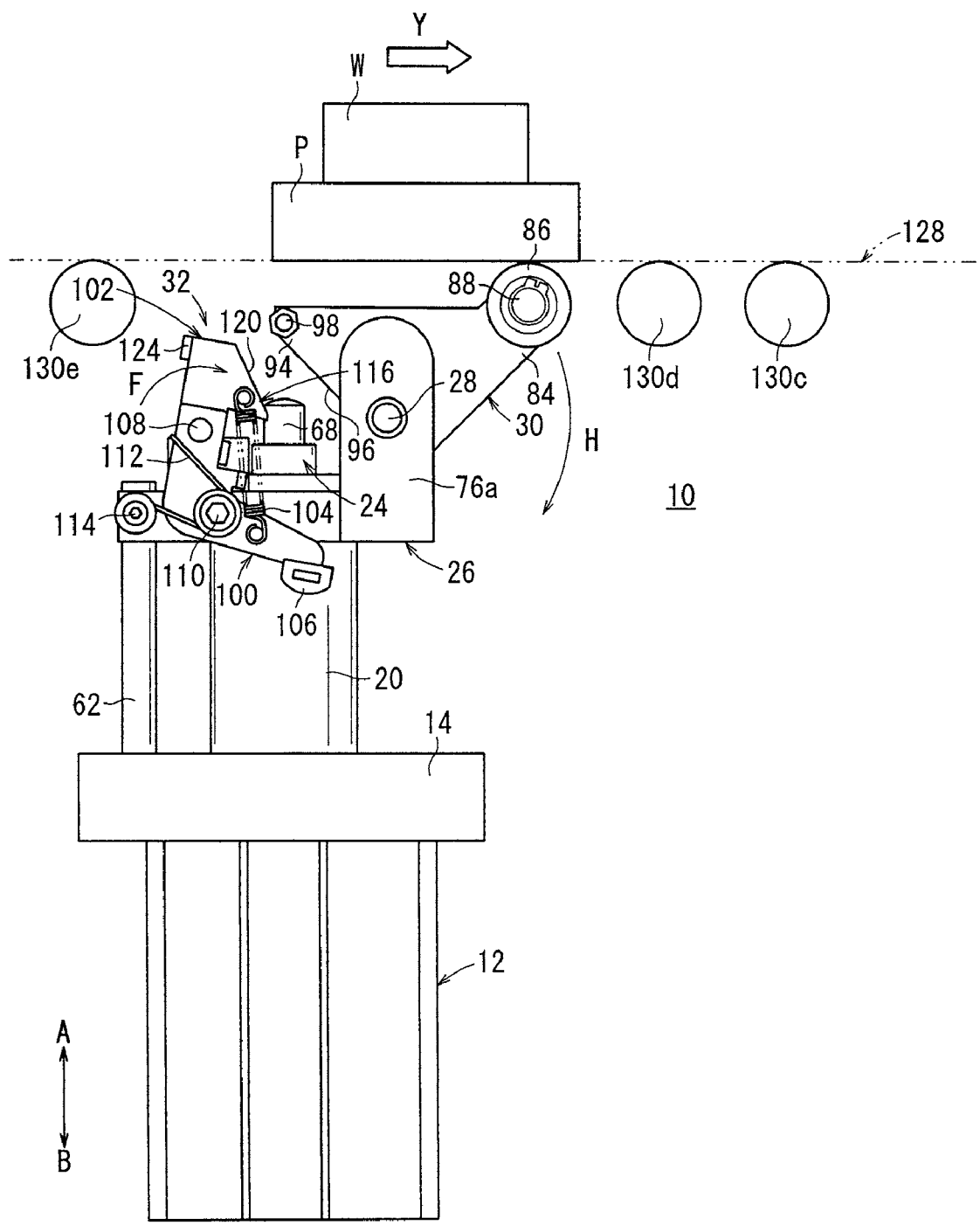
FIG. 16 is a schematic front view illustrating a state in which the pallet shown in FIG. 15 presses further upon the lever, whereby the lever is further rotated and displaced, permitting the rollers to abut against the lower surface of the pallet, whereupon engagement of the lock pin of the lock mechanism is released.

In this situation, as shown in FIG. 15, under a rotary action of the lever 30, the lock pin 98 provided on the lever 30 presses in an upward direction against the lock pawl 116 of the second bracket 102 of the lock mechanism 32.

Accordingly, the second bracket 102 is rotated and displaced in a counterclockwise direction (direction of the arrow G) with respect to the first bracket 100, while pulling and tensioning the lock spring 104 about the center of the bracket pin 108. The lock pin 98 moves and slides toward the forward end of the lock pawl 116 along the perpendicular surface 118 of the lock pawl 116.

Specifically, the lock pin 98 that engages with the lock mechanism 32 is displaced together with the lever 30, while rotating the second bracket 102 in accordance with rotational displacement of the lever 30. Accordingly, the lock mechanism 32 does not inhibit rotational displacement of the lever 30. Thus, a pressing force applied by the lock pin 98 to the second bracket 102 does not increase excessively.

The pallet P with the workpiece W thereon is further moved in the direction (direction of the arrow Y) opposite to the transport direction, so that the lever 30, which is pressed by the pallet P, is further rotated. Accordingly, the second bracket 102 is further pressed and rotated by the lock pin 98, whereupon the lock pin 98 becomes disengaged from the forward end of the lock pawl 116. The rollers 86 provided on the lever 30 abut against the lower surface of the pallet P (see FIG. 16).

As described above, the lever pin 28 of the lever 30 rotates and displaces the second bracket 102 of the lock mechanism 32 by the lock pin 98, under a rotary action of the lever 30. Therefore, the lock pin 98 is released from its state of engagement caused by the lock pawl 116 of the second bracket 102. Accordingly, the operator can smoothly and easily move the workpiece W in a direction opposite to the transport direction, even when the lock mechanism 32 is in a locked state, in which rotational displacement of the lever 30 is regulated.

Figure 17:
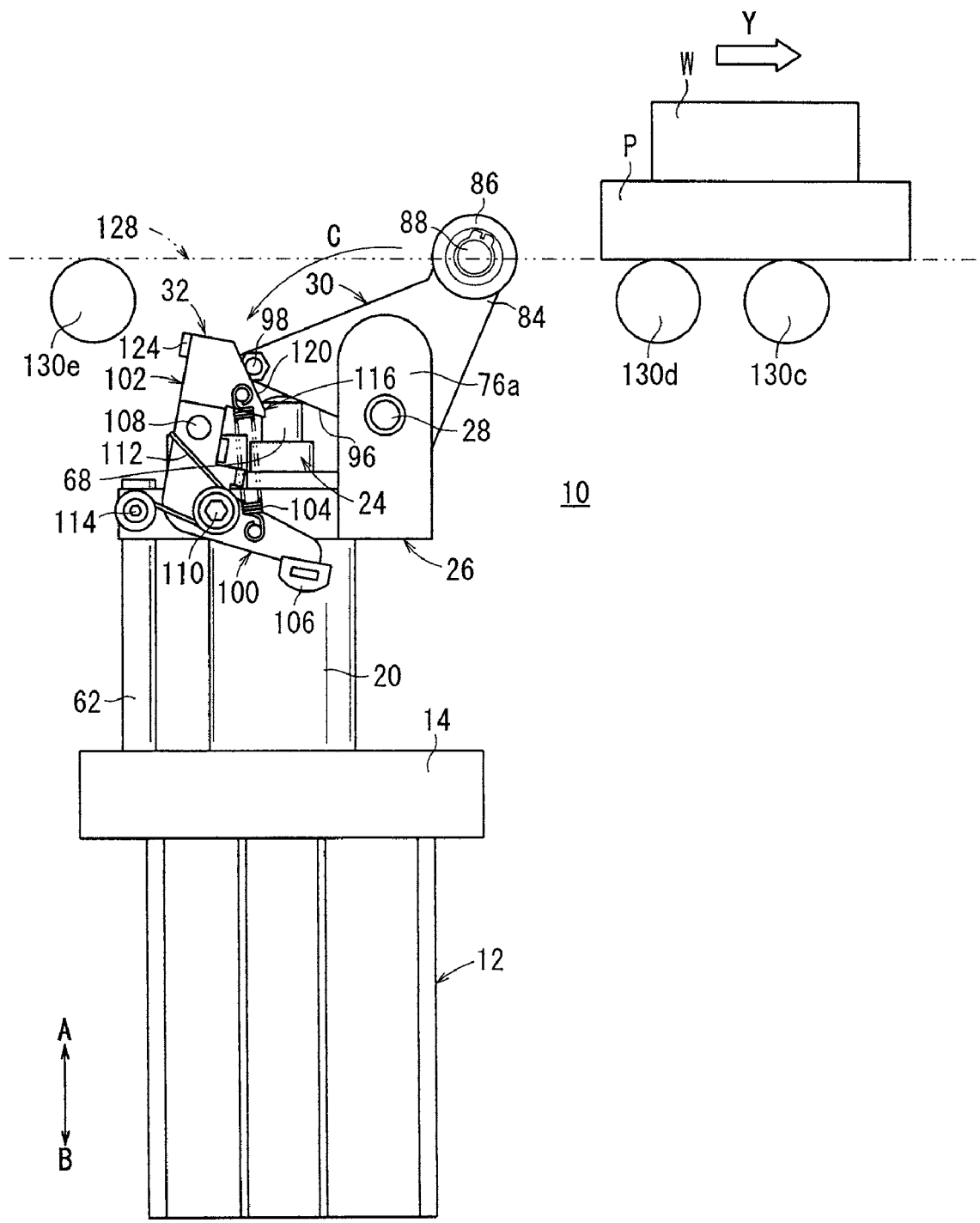
FIG. 17 is a schematic front view illustrating a state in which the workpiece shown in FIG. 16 is further transported, such that the workpiece and the lever do not contact each other, and thus the lever is rotated in an opposite direction by means of a repulsive force of a first return spring, whereupon the stopper cylinder is restored to its initial position.

The workpiece W is transported in a direction opposite to the predetermined direction along the rollers 86 and the roller conveyors 130a to 130f. As shown in FIG. 17, the pallet P with the workpiece W thereon passes over the rollers 86, and the lever 30 is rotated and displaced in a counterclockwise direction (direction of the arrow C) as a result of the repulsive force of the first return spring 92, which is wound around the lever pin 28. The lever 30 is restored to its initial position, in which the lever 30 is released from the locked state, such that the lock pin 98 abuts against the guide surface 120 of the lock pawl 116.

As described above, in the embodiment of the present invention, the lock mechanism 32, which regulates rotational displacement of the lever 30, comprises first and second mutually rotatable brackets 100 and 102. Further, the lock spring 104, which is interposed between the first bracket 100 and the second bracket 102, pulls and tensions the unlocking section 106 of the first bracket 100 as well as the lock pawl 116 of the second bracket 102, in directions so as to approach one another.

Accordingly, when the workpiece W is transported along the transport line 128 in a direction opposite to the predetermined transport direction, while the lever 30 is in a locked state effected by the lock mechanism 32, the workpiece W abuts against and is pressed by the lever 30, whereas the second bracket 102 is rotated by the lock pin 98 under a rotary action of the lever 30. Accordingly, the lock pin 98 that engages with the lock pawl 116 of the second bracket 102 is released from its state of engagement. The lever 30 also is released from its rotation-regulated state caused by the lock mechanism 32. Therefore, the workpiece W can be transported appropriately in an opposite direction (direction of the arrow Y).

In this situation, owing to rotation of the second bracket 102 with respect to the first bracket 100, the pressing force, applied to the second bracket 102 by the lock pin 98 when the lever 30 is rotated, does not increase excessively. As a result, loads exerted on the first and second brackets 100, 102 making up the lock mechanism 32 can be mitigated when the lever 30 is rotated.

The damper mechanism 24 can be attached to and detached from the stopper cylinder 10. Therefore, for example, when the damper mechanism 24 is exchanged, the entire stopper cylinder 10 doesn't have to be changed, and maintenance can be performed easily by exchanging only the damper mechanism 24. Therefore, maintenance costs for the stopper cylinder 10 can be reduced, while improving maintenance performance.

Although certain preferred embodiments of the present invention have been shown and described in detail, it should be understood that various changes and modifications may be made therein without departing from the scope of the appended claims.

What is claimed is:

1. A stopper cylinder for stopping a workpiece at a predetermined position when said workpiece abuts against a roller and retaining a lever at the predetermined position, said workpiece being transported in a predetermined direction, wherein said roller is rotatably supported by said lever, said stopper cylinder comprising:
   a main cylinder body;
   a lever holder disposed on an upper side of said main cylinder body, said lever holder rotatably supporting said lever through a predetermined angle;
   a lock pin disposed on a side surface portion of said lever;
   a lock mechanism comprising a first rotary member rotatably supported on a side surface portion of said lever holder, a second rotary member rotatably supported with respect to said first rotary member and having an engaging section for engaging said lock pin, and a spring interposed between said first rotary member and said second rotary member, said spring regulating a rotary action of said lever; and
   an unlocking section disposed on said first rotary member, which releases said lever from a locked state effected by said lock mechanism by rotating said first rotary member,
   wherein said spring produces a repulsive force such that said engaging section is urged toward said lock pin when said lock pin engages with said lock mechanism, and wherein said second rotary member is rotationally displaced by said lock pin against the repulsive force of said spring in accordance with rotation of said lever when an external force is applied to said lever in a direction opposite to the transport direction of said workpiece.

2. The stopper cylinder according to claim 1, wherein said engaging section comprises:
   a perpendicular section with which said lock pin engages in a locked state, when rotation of said lever is regulated; and
   an inclined section inclined at a predetermined angle with respect to said perpendicular section and against which said lock pin abuts in an unlocked state, when said lever is rotatable,
   wherein said lock pin is guided along said inclined section by a rotary action of said lever, and said lock pin engages with said perpendicular section.

3. The stopper cylinder according to claim 2, wherein said unlocking section faces said main cylinder body, and said unlocking section abuts against an end of said main cylinder body and is pressed thereby, so that said lever is released from said locked state effected by said lock mechanism.

4. The stopper cylinder according to claim 3, wherein said main cylinder body includes a damper mechanism facing said lever, so as to buffer impacts exerted when said lever makes abutment, and wherein said damper mechanism is detachable with respect to said main cylinder body.

5. The stopper cylinder according to claim 4, wherein said main cylinder body comprises:
   a cylinder tube;
   a rod cover and a head cover, which close respective ends of said cylinder tube, thereby forming a cylinder chamber;
   a piston displaceable along said cylinder chamber under action of a pressure fluid supplied to said cylinder chamber; and
   a piston rod connected to said piston and having said lever holder connected thereto,
   wherein said damper mechanism is installed inside of said piston rod.

6. The stopper cylinder according to claim 5, wherein said spring urges said engaging section of said second rotary member and one end of said first rotary member that faces said engaging section in directions that approach one another.

7. The stopper cylinder according to claim 6, wherein said lock pin is retained in engagement with said engaging section of said second rotary member by a spring force of said spring.

8. The stopper cylinder according to claim 7, wherein said second rotary member includes a fastening tab that regulates relative rotational displacement of said second rotary member with respect to said first rotary member.

9. The stopper cylinder according to claim 8, wherein said fastening tab comprises:
   a first fastening tab that regulates displacement of said engaging section toward said first rotary member; and
   a second fastening tab that regulates displacement of said engaging section in a direction away from said first rotary member.

* * * * *